J. A. HUTCHINSON & D. ARMSTRONG.
Machine for Forging Horseshoe-Nails.

No. 205,554. Patented July 2, 1878.

Fig. 1.

Witnesses.
J. W. Gillett
A. P. Kinney

Inventors.
J. A. Hutchinson
D. Armstrong
L. Burridge & Co
Attys.

J. A. HUTCHINSON & D. ARMSTRONG.
Machine for Forging Horseshoe-Nails.

No. 205,554. Patented July 2, 1878.

Fig. 4.

Witnesses
Inventors.

J. A. HUTCHINSON & D. ARMSTRONG.
Machine for Forging Horseshoe-Nails.

No. 205,554.  Patented July 2, 1878.

Fig. 5.

Witnesses.  Inventors.

J. A. HUTCHINSON & D. ARMSTRONG.
Machine for Forging Horseshoe-Nails.

No. 205,554.  Patented July 2, 1878.

Witnesses.  Inventors.

J. A. HUTCHINSON & D. ARMSTRONG.
Machine for Forging Horseshoe-Nails.

No. 205,554. Patented July 2, 1878.

Witnesses
H W Gillett
A T Kinney

Inventors.
J A Hutchinson
D Armstrong
Per Burridge & Co
Atty

UNITED STATES PATENT OFFICE.

JOHN A. HUTCHINSON, OF CHICAGO, ILLINOIS, AND DANIEL ARMSTRONG, OF KEESEVILLE, NEW YORK, ASSIGNORS TO SHERIDAN HORSE NAIL COMPANY, OF CLEVELAND, OHIO.

IMPROVEMENT IN MACHINES FOR FORGING HORSESHOE-NAILS.

Specification forming part of Letters Patent No. 205,554, dated July 2, 1878; application filed April 19, 1878.

*To all whom it may concern:*

Be it known that we, JOHN A. HUTCHINSON, of Chicago, in the county of Cook and State of Illinois, and DANIEL ARMSTRONG, of Keeseville, in the county of Essex and State of New York, have invented a certain new and Improved Horseshoe-Nail Machine; and we do hereby declare that the following is a full, clear, and complete description thereof, reference being had to the accompanying drawings, making a part of the same.

The figures on Sheets 6 and 7 are detached sections.

Like letters of reference refer to like parts in the several views.

The improvements herein described relate to a machine for making horseshoe-nails, the distinguishing features of which, in part, consist of certain mechanism whereby the nail-rod is fed to the machine and a device for holding the rod while the nail is being formed by the co-operation of a pair of side hammers or dies and a revolving hammer.

The invention also relates to a device for operating the side hammers or dies, and certain other devices, whereby the feeding-section of the machine is made to perform its functions in a twofold manner.

Figure 6:
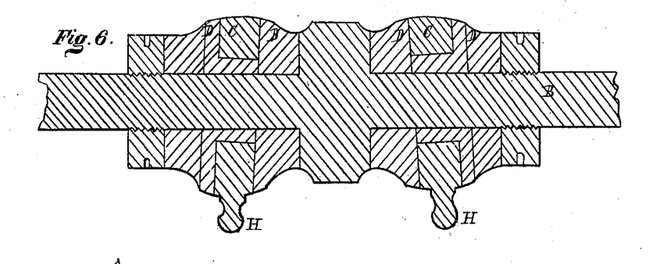

A further and more full description of the construction of the abovesaid improvements, and of others subsidiary thereto, and of the practical operation of the same, is as follows: In a suitable frame, represented at A, is journaled a shaft, B, carrying a pair of cams, consisting of the shoulders D D, between which is arranged a ring or collar, C, fitting loosely in the annular groove, substantially as shown in Fig. 6.

It will be observed that the annular grooves are not at right angles to the axial line of the shaft, but, on the contrary, are oblique in their relation to said axial line; hence, on revolving the shaft, the collars C will have a lateral movement, for a purpose hereinafter shown.

Figure 1:
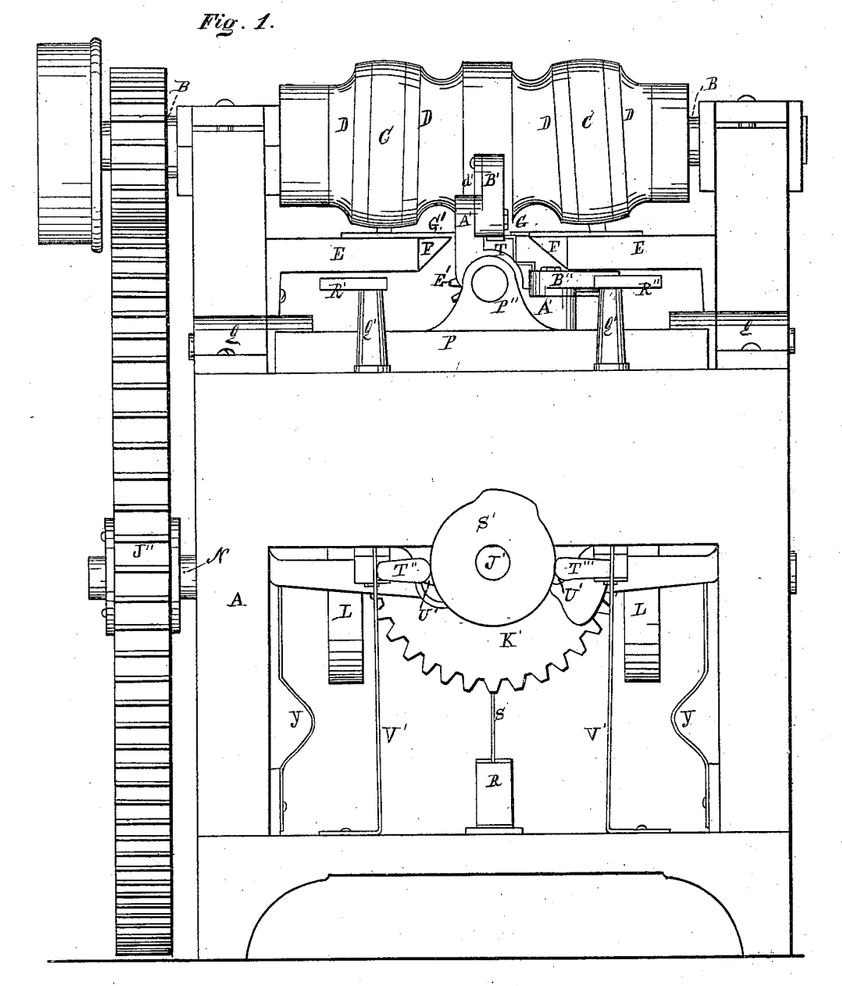
Figure 1 is a front elevation of the machine.
Figure 2:
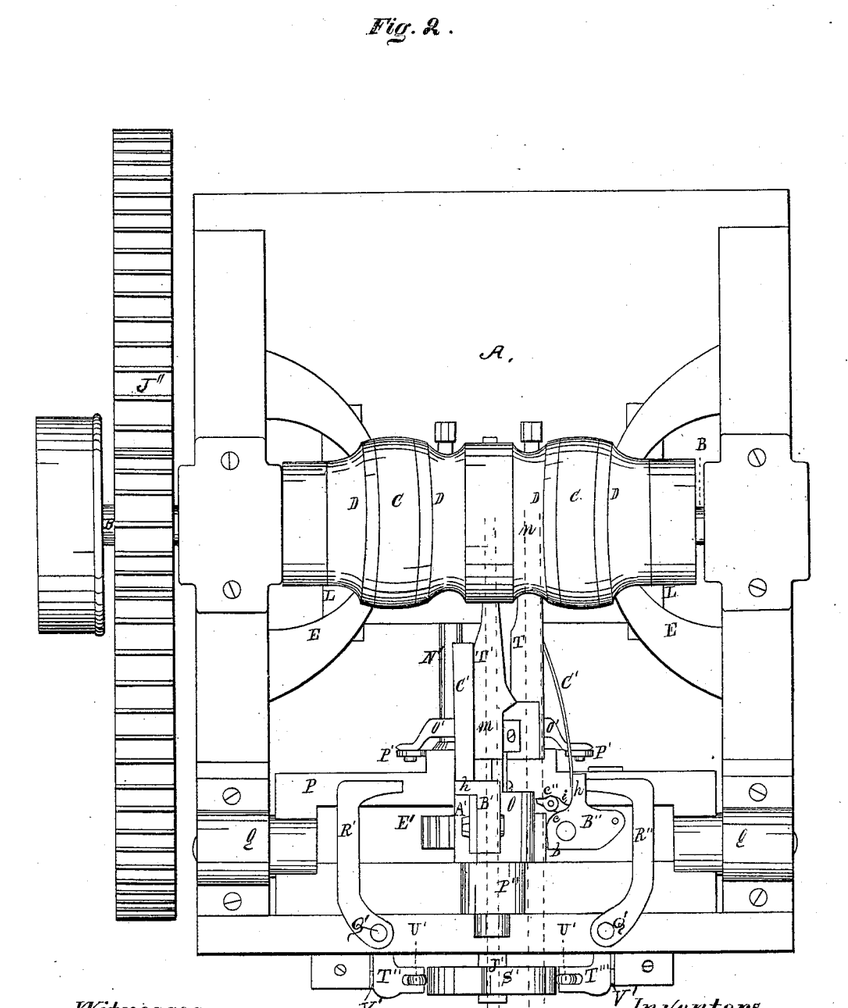
Fig. 2 is a plan view.
Figures 7, 8, 9, 10:
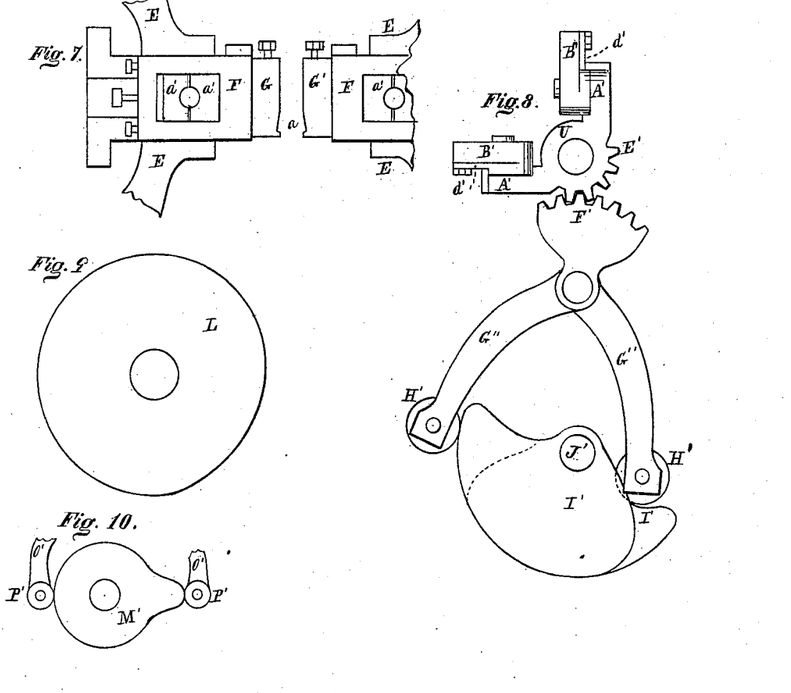

Immediately under the shaft B is a pair of brackets, E, Figs. 1 and 2, in each of which is a horizontally-reciprocating slide, F, Fig. 1, also shown in Fig. 7, Plate 6. In said slides are secured by any suitable means the side hammers or dies G G', Fig. 4. In the edge of each of the dies is a depression, $a$, the same in contour as one side of the head of a horseshoe-nail. These depressions, on bringing the two dies or hammers near to each other, form the contour of the nail-head, as seen in Fig. 7.

Figure 4:
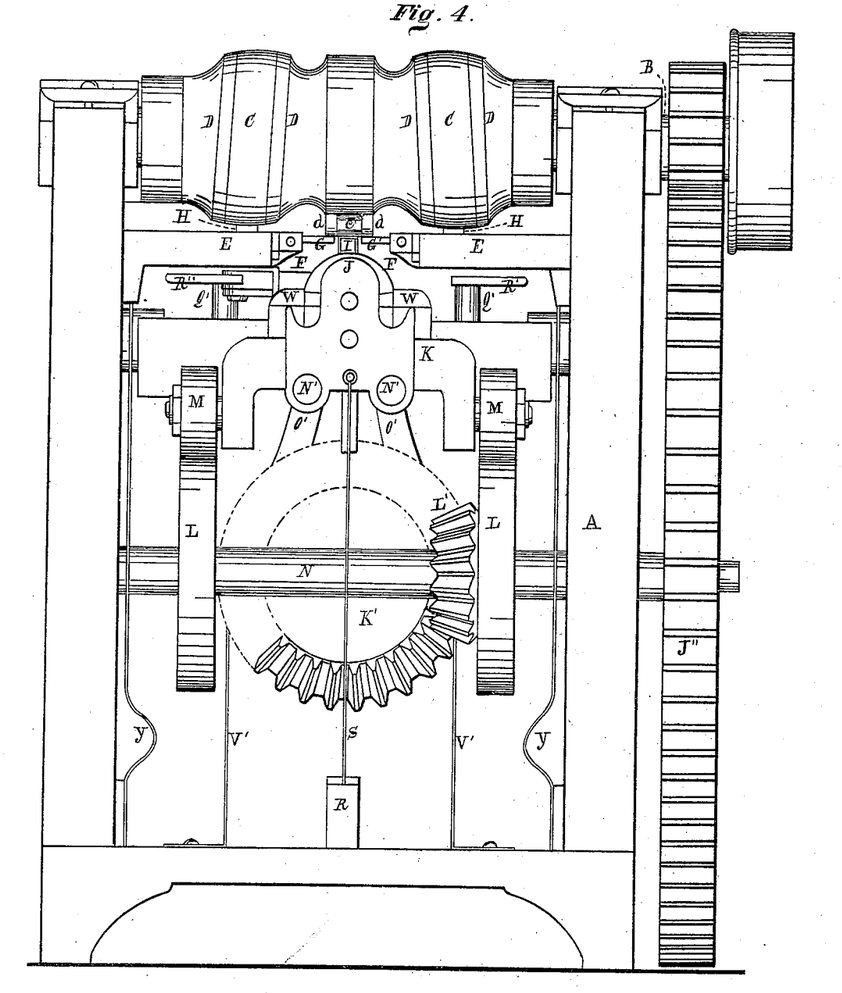
Fig. 4 is a rear elevation.
Figure 5:
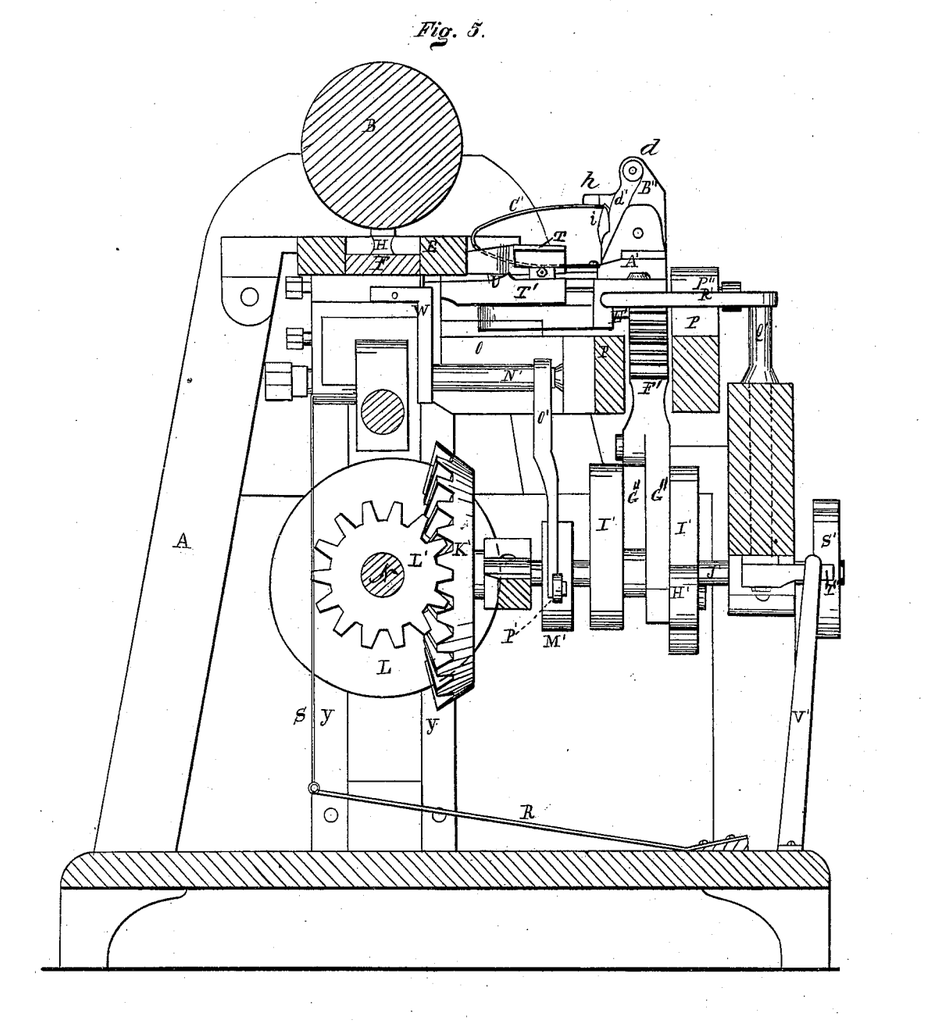
Fig. 5 is a side elevation, partially in section.

The slides F are attached to the collars C C above referred to by a ball, H, Figs. 4 and 5, fitted in socket-boxes $a'$, making a universal joint.

The operation of the slides is as follows: As the shaft B revolves the lateral movement of the collars C C actuates the slides, giving to them a horizontally-reciprocating movement, for a purpose hereinafter shown. Directly below the hammers of the slides above described is an anvil, I, Fig. 4. (Shown more clearly in the detached section, Fig. 11, Plate 7.) Said anvil is secured in a block, J, forming the head of a frame, K, supported upon the cams L L by rollers M M, one of which is attached to each side of the said frame. The relation of the rollers to the cams is fully shown in Fig. 4. By reference to said figure it will be seen that the cams are secured to a shaft, N, having its bearings in the sides of the frame A.

Figure 3:
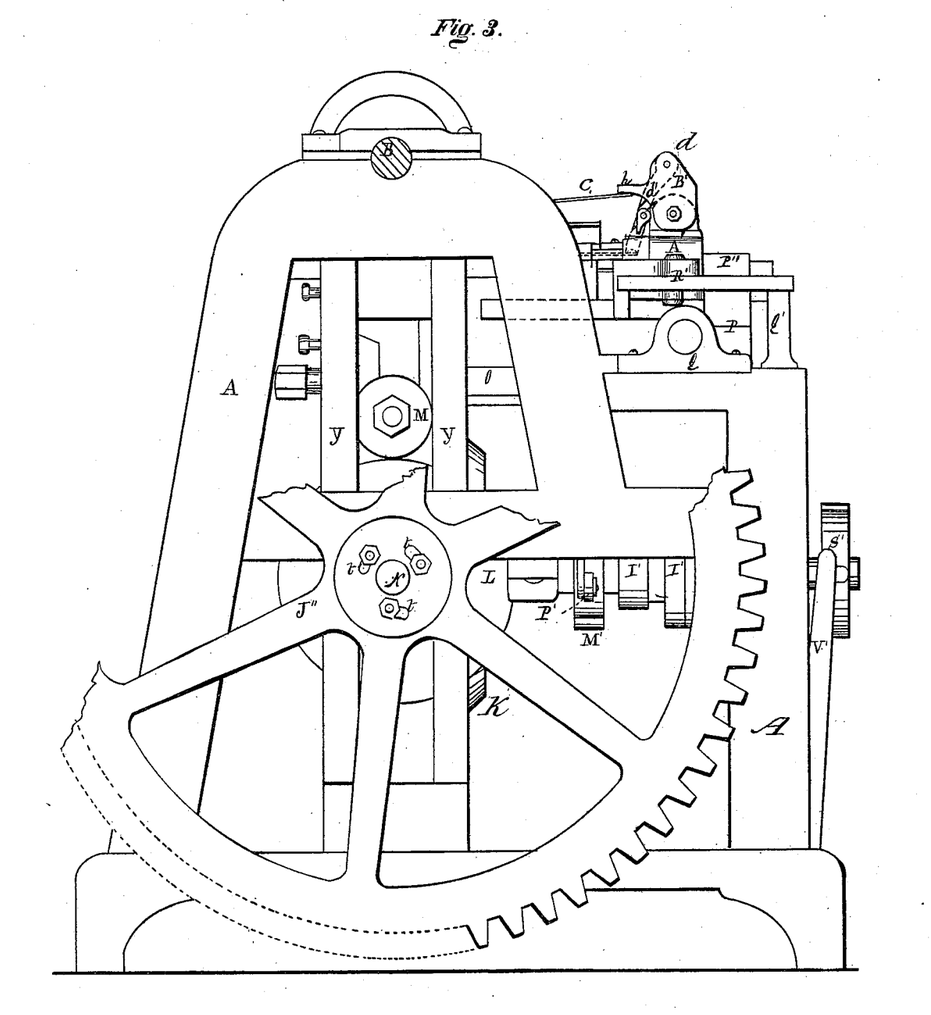
Fig. 3 is a side elevation.

The anvil block and frame are attached by an arm, O, Fig. 5, to a rectangular vibrating frame, P, Fig. 2, the ends of which are journaled in the top of the frame A in the boxes Q, Figs. 2 and 3. In thus attaching the anvil and block, together with its frame K, to the frame P, the anvil block and frame are allowed an upward movement by virtue of the vibration of the frame P, journaled, as aforesaid, in the boxes Q.

The upward movement of the anvil, &c., is effected by the cams L L, whereas its downward movement is the result of gravity, and the spring R attached thereto by a rod, S, Fig. 5.

Figure 11:
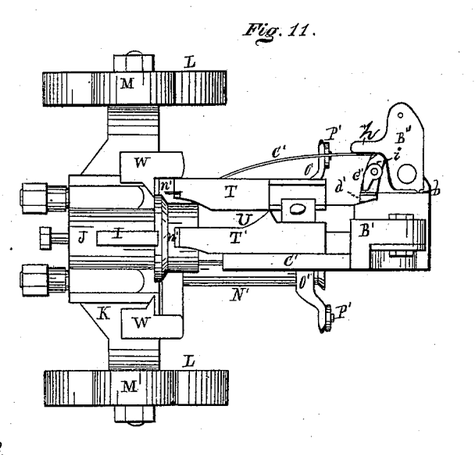

The device for conducting the nail-rod to the anvil and dies or hammers consists of a pair of guides, T T', Figs. 1, 2, and 11. Said guides are tubes secured to the sides of a rod-carrier, U, Fig. 5, pivoted between the stud P″ and the anvil-block alluded to by means of a pin or rod passing loosely through said carrier U, and upon which the carrier and its guides or tubes T T′ partially rotate.

The relative position of the two guides in respect to each other is such as to place them quartering upon the carrier; hence, when the guide T′ is above the carrier, as shown in Fig. 11, the guide T will be down on its side. From the carrier U, to which the guides are attached, project studs A′ A′, Figs. 1 and 8, to the sides of which are pivoted, respectively, the clamps B′ B″.

It will be observed that the distance from the axial line of the pivot to the point b, Fig. 2, of the clamp is longer than from said pivot to the side c. The object of this will presently be shown.

Said clamps alluded to are retained in the positions shown in the drawings by springs C′, so arranged in relation to the clamps that the free ends of the springs are under the arms h thereof. The resiliency of the springs holds the clamps in the position shown, as aforesaid.

The carrier U above referred to and its appendages are partially rotated by a segment of gear, E′, forming a part of the said carrier, as seen in Figs. 2 and 8. Said segment of gear is made to engage a segment of gear, F′, forming the head of a pair of arms, G″, pivoted to the side of the frame A. In the end of each of said arms is a roller, H′. These rollers are so arranged in relation to a pair of cams, I′, Figs. 5 and 8, as to cause the rollers to run upon the faces thereof for operating the arms and segments above alluded to.

The aforesaid cams I′ are secured to a shaft, J′, revolved by a gear-wheel, K′, thereon, and which engages the corresponding gear-wheel L′ on the shaft N above referred to. The relation of the gear-wheels to each other, and their engagement, are shown in Figs. 4 and 5. Also, on the shaft J′, carrying the cams I′, is a cam, M′, for operating the shears W W, arranged, respectively, on each side of the arm O, above alluded to, as hereinafter described.

Figures 12, 13, 14, 15:
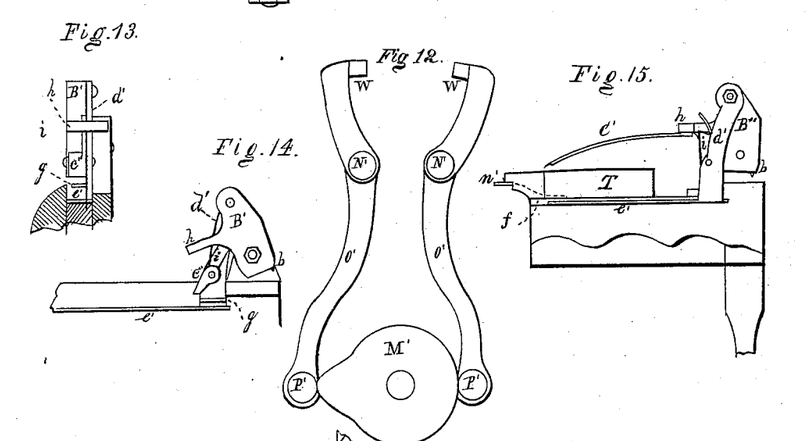

From each of the shafts N′, Figs. 5 and 12, projects an arm having secured thereto one blade of the said shears. The shears are actuated by arms O′ of the shafts N′, at the ends of which arms are rollers P, arranged to run upon the cam M′, which, as it revolves, vibrates the arms, and thereby causes the shears to act. A detached view of said shears, arms, and cam is shown in Fig. 12, Plate 7.

Q′ Q′ are a pair of rotative standards, to the upper ends of which are respectively secured arms R′ and R″, Figs. 1 and 2. Said arms are partially rotated by a cam, S′, Figs. 1 and 2, secured to the outer end of the shaft J′, carrying the gear-wheel K′. Said cam engages the arms T″ T‴, secured respectively to the lower ends of the standards Q′. In the ends of said arms are rollers, U′, which run upon the cam S′, as shown in Fig. 2. As will be obvious, said cam, as it revolves, operates the arms T″ and T‴, thereby actuating the arms R′ R″, as aforesaid. The said arms T″ T‴ are continued in contact with the face of the cam by springs V′ arranged in relation thereto, as shown in the drawings.

The practical operation of the above-described machine is as follows: The relative positions of the several parts of the machine in respect to each other, as shown in Figs. 1 and 2 of the drawings, are such as when a nail is in process of being made. In said drawings it will be seen that the guide T′ is above the guide-carrier, and that the guide T is down on one side thereof. The dotted lines m indicate a nail-rod passed through the guide T′, from which a nail is being formed by the co-operation of the dies or side hammers G G′ and revolving hammers c′. For convenience of explanation, let it be supposed that the operations on a nail are completed, and that another nail is to be made. To this end a nail-rod is inserted in the guide T while it is at the side of the carrier, and is pushed so far through the guide as to bring its forward end under the slide F of the side hammer or die G, the proper distance being determined by a gage. A rod thus inserted in the guide is indicated by the dotted lines n, Fig. 2. At the moment that the hammers are to cease to act upon the nail-rod in the guide T′ the anvil I, which at this time is elevated, is suddenly lowered from the dies or hammers by the timely movement of the cams L L, whereon the frame K of the anvil is supported, as above described. During the dropping of the anvil the guide-carrier U is rotated so far as to bring the guide T from the side to the upper side of the carrier— the position previously occupied by the guide T—and directly in line with the dies. The lowering of the anvil alluded to allows the passing up of the nail-rod under the die G to a position between the two side dies and over the anvil, and at the same time allows the nail already formed to pass from between the dies and under the die G′ down to one side of the carrier to be cut from the rod m, as presently shown.

By the time the nail-rod n comes between the dies or hammers the anvil is again elevated by the timely movement of the cams L L to a proper position under them, and the end of the nail-rod will now rest on the said anvil between the dies, to be operated thereon by them. The shaft B, bearing the collars C C, during its rotative movement brings the revolving hammer c′ (pivoted in the cheeks d projecting from the face of the shaft) down upon the end of the rod lying upon the anvil between the dies, thereby flattening down the said end and drawing it out more or less. The moment that the revolving hammer leaves the rod the two side dies G and G′ move forward simultaneously by the co-operation of the collars C C′ above described, thereby hammering or compressing the sides of the rod flattened by the revolving hammer c′. During this operation of the side hammers or dies upon the rod the shaft B makes one revolution, bringing the hammer $c'$ again to the front, at which instant the side dies or hammers open by the co-operation of the said collars C C, which allows the revolving hammer $c'$ to pass again between them, thereby rolling down the compressed end of the rod and drawing the same lengthwise upon the anvil into proper shape and thickness for a nail—that is to say, so much of the rod is drawn or extended as lies between the dies. The entire rod is prevented from being drawn along by the revolving hammer by the clamp B', which, in consequence of its cam-like shape, binds the rod between the end $b$ thereof and the side of the guide-carrier or head to which the clamp is pivoted.

The operation of the revolving hammer $c'$ upon the rod is repeated several times alternately with the operation of the side hammers or dies, which are repeated a corresponding number of times upon the rod or nail now partially formed or completed, so far as the dies and hammers are concerned. At this stage in the process of forming the nail the guide carrier and clamps are partially rotated by one of the cams I' I' and segments E' and F' above described, thereby returning the guide T and its rod to its former position down on the side of the carrier. To allow this return of the rod and nail now formed on the end thereof by the hammers, the anvil is at this instant lowered by virtue of the movement of the cams L L alluded to. The guide, as it returns to its side position, brings the rod to the shear W, whereby the nail formed thereon is cut off directly back of its head. The shear is actuated at the proper time by the cam M' and one of the arms O', which, in the organization of the machine, are so arranged as to act promptly at the proper moment for this purpose.

On the return of the guide to its side position the clamp B'' is made to release its hold upon the rod by means of the arm R'', as shown in Fig. 2. Said arm R'' is forced against the lip $h$ of the clamp, thereby forcing the end $b$ from its contact with the rod, so that the rod may be fed forward to the machine, to be again submitted to the action of the hammers, as above described, and for the purpose specified. This timely service of the arm R''' is effected by the cam S' acting upon the arm T''', Fig. 2, of the rotative standard Q' hereinbefore described.

The rod, after the nail formed by the hammers has been severed and relieved from the gripe of the clamp, is pushed forward again under the slide of the hammer G, and is carried up thereunder to the anvil, which, for that purpose, is at the proper moment suddenly lowered to allow it to pass up, as above-said. The device for feeding forward the rod to the machine will hereinafter be described.

It will be observed that the feeding device of this machine is a double one—that is to say, the one half is a duplicate of the other; hence the operation of the second half of the said device is substantially a repetition of the first above described, and which is as follows: During the time that the rod $n$ in the guide T is being operated upon by the hammers the guide T' is down upon the side of the guide-carrier, as shown in Fig. 8, in which position it is supplied with a nail-rod. Said rod is griped by the clamp B', as was the rod $n$ by the clamp B'', and for the same purpose.

The device for feeding the nail-rod to the machine consists of a dog, $c''$, Fig. 2, also shown in the detached sections on Plate 7. Said dog is pivoted to the side of an arm, $d'$, the upper end of which is pivoted to the side of the clamp B'. To the lower end of the arm $d'$ is secured a foot, consisting of a strip of metal, $e'$, Figs. 13 and 15, arranged lengthwise in a groove, $f$, made in the guide-carrier directly along under the guide, as shown in Fig. 15. Below the lower end of the dog is a projection, $g$, Figs. 13 and 14, in range with and about on a level with the bottom of the guide. The upper end of the dog consists of an arm, $i$, projecting so far upward as to engage the inner side of the arm $h$ of the clamp, as shown in Figs. 13 and 15.

The operation of the feeding device is as follows: During the operation of the machine, the moment that the arm R' is forced against the arm $h$ of the clamp, in order to release the rod held thereby, the rotative movement of the clamp causes the arm $d'$ to move forward, taking with it the rod at this instant released from the clamp B'. The rod is carried forward, when no longer held by the clamp, by the dog. While the rod is held by the clamp, it is also held between the dog and the projection $g$—that is to say, the free end of the dog is in close contact with the rod at the time it is being griped by the clamp, and at which time the rod is clamped between the dog and the projection $g$ above referred to. The hold that the dog has upon the rod continues when the rod is released from the clamp; hence it will be obvious that the dog, as it is moved forward by the arm $d'$, to which it is attached, must carry forward the rod with it. The position of the dog at this time in its relation to the rod is such as shown in Fig. 11.

When the rod has been carried forward by the dog and the projection $g$, far enough into the machine for a nail, the dog is caused to release its hold upon it by the arm $h$ of the clamp, which, at the proper instant, during the moving forward of the rod, impinges upon the arm $i$ of the dog, pushing it back, which, as a consequence, throws forward and upward the lower end of the dog, and therefore draws the dog away from its contact with the rod. The positions of the dog and clamp at this time are as shown in Fig. 14. The rod thus fed forward into the machine is again clamped by the clamp B', which closes upon the rod, and prevents it from being pulled forward by the revolving hammer above described. This action of the clamp is due to the receding of the arm R' from its contact with the arm h of the clamp, which allows the clamp to resume its clamping position, as shown in Figs. 11 and 15, by the resiliency of the spring C'.

It will be seen that the clamp confines the rod to the guide-carrier, whereas the dog confines the rod to the projection g, and therefore the rod must move forward along with the dog and the arm to which the projection is secured when released from the clamp.

It will be obvious that by this device the nail-rods are fed to the machine automatically at regular and proper times during its operation, hence requiring no special care further than to furnish the necessary rods as fast as they may be worked up.

The upward movement of the anvil hereinbefore described is so timed that it does not attain its highest elevation at the moment the first blow of the revolving hammer is given, but continues to rise after several blows are given. This movement of the anvil relatively to the blows of the hammer is to provide for a gradual reduction of the metal presented to the first strokes of the revolving hammer, so that the iron shall suffer no undue strain, nor be weakened in the process of being hammered.

The side hammers are secured in the slides by set-screws, whereby they may be adjusted for any needful purposes. The outer ends of the slides are supported in position by the springs Y, to which they are attached, as shown in the drawings.

In the ends of each of the guides above described is a spring, n', Figs. 11 and 15. Said springs are to prevent the nails from hugging too closely to the anvil while it is being operated upon by the side dies or hammers. The spring lifts the nail a trifle above the face of the anvil, so that it may be fully within the embrace of the dies or hammers; hence no fin is left on the nail.

The driving-wheel J'' is so attached to the shaft as to be adjustable thereon. The device whereby the wheel is secured thereto is as hereinafter described.

Figure 16:
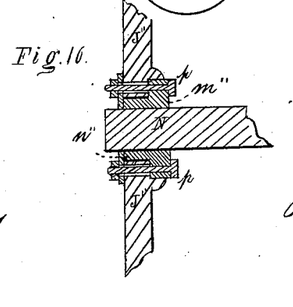

To the shaft is keyed a collar or hub, m'', Fig. 16, Plate 7, on the boss n'' of which is fitted so as to be movable thereon the wheel J'', and said wheel is secured thereto by bolts p, passing through the flange of the hub m'' and through the hub of the wheel, substantially as shown in Figs. 3 and 16.

In order that the wheel may be turned on the shaft, the bolt-holes in the hub of the wheel are slotted, as seen at t in Fig. 3.

The object in having the wheel thus adjustable is to so adjust the wheel in its relation to the shaft B that the revolving hammer c' may strike the nail at the proper moment in the general movement of the machine when the anvil is elevated so as to be within the reach of the revolving hammer.

What we claim as our invention, and desire to secure by Letters Patent, is—

1. The shaft B, provided with the central collar carrying the revolving hammer c', in combination with the cam-shoulders D D and collars C C, substantially as and for the purpose set forth.

2. The driving-shaft B, with its central collar carrying the revolving hammer, the cam-shoulders D D and collars, in combination with the slides F F, side hammers G G', and pivoted anvil-frame and anvil, substantially as and for the purpose specified.

3. The driving-shaft with its central collar carrying the revolving hammer, the cam-shoulders D D and collars, slides F F, side hammers, and pivoted anvil-frame and anvil, in combination with the shaft N, cams L L, and connecting-gears, whereby the anvil is lowered after the nail is formed, to permit the removal of the nail and rod, as and for the purpose set forth.

4. The combination of the guide T, spring n', and pivoted anvil-frame K P with the side hammers G G' and revolving hammer c', substantially as described, and for the purpose specified.

5. The combination, with the side hammers and revolving hammer, of a vibrating rod-carrier, means for lifting the rod from the anvil to a position to be fully operated upon by the side hammers, and suitable mechanism for operating said hammers, substantially as and for the purpose set forth.

6. In combination, with a vibrating anvil-frame, a duplex vibrating rod-carrier mounted on said anvil-frame, means for elevating said anvil-frame, side hammers, and a revolving hammer, substantially as and for the purpose specified.

7. The combination, with side hammers G and G', revolving hammer c', and vibrating frame K P, of the vibrating rod-carrier U and cutters W W, substantially in the manner as described, and for the purpose set forth.

8. The cam-shoulders D D, collars C C, connected with the slides carrying the side hammers by universal joints, revolving hammer c', and anvil I, in combination with a duplex vibrating rod-carrier arranged to present the rods alternately to the action of the hammers, substantially as and for the purpose specified.

9. In combination with the vibrating anvil-frame K P, cams L L for raising said frame, side hammers, and revolving hammer, the duplex vibrating rod-carrier U, guides T T' thereon, and shears or cutters W, in the manner substantially as and for the purpose set forth.

10. The segment-gear F' E', arms G'' G''', cams I' I', shaft J', and its operating-gears, in combination with the vibrating duplex rod-carrier and vibrating anvil-frame, side hammers, and revolving hammer, substantially as as described, and for the purpose set forth.

11. The combination of the cutters or shears W W with the vibratory anvil-frame, the shaft N', arms O', and cam M', arranged to co-operate with the said vibratory frame, substantially as described, and for the purpose set forth.

12. In combination with the vibrating frame and its anvil, the side hammers or dies, and revolving hammer, the duplex vibrating rod-carrier, arranged and operating to present the rods alternately to the action of the hammers, substantially in the manner as and for the purpose specified.

13. In combination with the vibrating rod-carrier, guide T, spring $n'$, pivoted clamp $B'$, and spring $C'$, substantially as described, and for the purpose specified.

14. The vibrating arm $R'$, pivoted clamp $B'$, and vibrating rod-carrier, arranged and co-operating substantially as set forth, and for the purpose specified.

15. The arms $R'$ $R''$, cam $S'$, arms $T''$ $T'''$, springs $V'$, vibrating standards, pivoted clamps $B'$ $B''$, and vibrating rod-carrier, arranged and co-operating in the manner as set forth, and for the purpose specified.

16. The herein-described feeding device, consisting of the arm $d$, projection or shoulder $g$, and dog $c''$, in combination with the clamp $B'$, substantially as described, and for the purpose specified.

In evidence and testimony whereof we hereunto duly subscribe our names.

JOHN A. HUTCHINSON.
DANIEL ARMSTRONG.

Witnesses:
J. H. BURRIDGE,
EDWIN BARNES.